United States Patent [19]

Katzer et al.

[11] Patent Number: 4,572,235
[45] Date of Patent: Feb. 25, 1986

[54] MIXING APPARATUS

[75] Inventors: Johann Katzer, Neu-Ulm; Franz Lopic, Nersingen; Roland Sauer, Ulm-Gögglingen; Christian Stephany, Ulm-Wiblingen, all of Fed. Rep. of Germany

[73] Assignee: Gardena Kress & Kastner GmbH, Fed. Rep. of Germany

[21] Appl. No.: 521,927

[22] Filed: Aug. 10, 1983

[30] Foreign Application Priority Data

Aug. 19, 1982 [DE] Fed. Rep. of Germany ....... 3230783

[51] Int. Cl.$^4$ .............................................. F17D 1/00
[52] U.S. Cl. .................................... 137/268; 422/263
[58] Field of Search ......................... 137/268; 422/263

[56] References Cited

U.S. PATENT DOCUMENTS

| 1,677,645 | 7/1928 | Luthander . | |
|---|---|---|---|
| 2,064,178 | 12/1936 | Pickard . | |
| 2,165,868 | 7/1939 | Martin . | |
| 2,419,845 | 4/1947 | Merrick . | |
| 2,582,175 | 1/1952 | Stitz | 137/268 X |
| 3,083,916 | 4/1963 | Neel . | |
| 3,195,558 | 7/1965 | Klueber | 137/268 |
| 3,474,817 | 10/1969 | Bates | 137/268 |
| 3,612,080 | 10/1971 | Schneider | 137/268 |
| 3,845,902 | 11/1974 | Delamater . | |
| 4,154,258 | 5/1979 | Duda et al. . | |
| 4,294,280 | 10/1981 | Tom | 137/268 |

FOREIGN PATENT DOCUMENTS

| 2038625 | 2/1972 | Fed. Rep. of Germany . |
| 2524146 | 12/1975 | Fed. Rep. of Germany . |
| 3014272 | 11/1980 | Fed. Rep. of Germany . |
| 905736 | 12/1962 | United Kingdom . |

Primary Examiner—Alan Cohan
Attorney, Agent, or Firm—Steele, Gould & Fried

[57] ABSTRACT

A device for adding a solid additive to a liquid has a liquid inlet, a liquid outlet and a receiving container for the solid additive in the form of a tablet or bar. The tablet or bar is hollow, being shaped like a cylindrical ring. The liquid is moved axially past the inner surface and outer surface of the cylindrical ring, and during wearing away of additive material, there is a reduction in the size of the outer surface and a corresponding increase in the size of the inner surface. Therefore, the overall surface area remains constant, which leads to constant admixing. Preferably, an inner tube spaced from the inner surfaces of the additive discharges liquid for flow across the inner and outer surfaces in the same direction.

11 Claims, 8 Drawing Figures

MIXING APPARATUS

BACKGROUND OF THE INVENTION

1. Field of the Invention

The invention relates to an admixing device for delivering additives in solid form to flowing liquids, the device having a liquid inlet, a liquid outlet and a receptacle for the additive.

2. Prior Art

Admixing devices of this type are, for example, known in connection with car wash brushes. The washing brush handle contains a cavity in which can be inserted a bar of soap. It is necessary for this purpose to unscrew the water inlet. The bar of soap supplies soap to the water flowing around it, so that the outflowing water contains soap and the bar of soap decreases in size. This type of admixing device has the disadvantage that it is difficult to replace the bar of soap, while the soap concentration in the outflowing water is imprecise. Thus, such an admixing device cannot be used where a precise dosing is required.

A device is already known for admixing with a liquid a solid which can be worn away by the liquid (Offenlegungsschrift No. 25 24 146). The solid additive is in the form of a bar and is displaceably mounted, so that water only flows round its face and the admixing of the additive remains laterally constant. The displacable mounting of the additive is, however, disadvantageous. Either the clearance is made large to permit the easy displacement, so that the water can also act on the surface areas of the bar, or the clearance is made small, so that a spring or the like must act on the bar.

An admixing device for admixing a solid additive with a liquid is also known (U.S. Pat. No. 2,419,845), in which the additive is in the form of a bar with an internal bore, the bore optionally extending completely through the bar. The outside of the bar-like additive and its bottom are provided with a coating resistant to the liquid, so that the additive can only be worn away at the bore surfaces. However, with increasing wearing away, the diameter and consequently the surface area is increased, and the delivered quantity of additive constantly increases, so that the delivery is not constant.

SUMMARY OF THE INVENTION

The object of the invention is to provide a simply constructed mixing device of the aforementioned type, which makes it possible to achieve a very accurate dosing of additives to the outflowing liquid over a long period.

According to the invention this object is achieved by a mixing device, in which the additive receptacle is constructed on both an inner and an outer surface area of the additive in the form of a hollow cylindrical tablet or bar, for the providing an axial flow-past of the liquid. This axial flow round the hollow cylinder has the important advantage that, at the time of wearing away, there is simultaneously a reduction in the size of the outer surface and an increase in the size of the inner surface, so that the surface remains constant over the entire life of the hollow cylindrical bar and consequently there is a constant delivery of additive. In addition, the dimensions of the hollow cylindrical bar are not critical and no displacement thereof is necessary.

For example, it is possible for the liquid to flow from one front face of the hollow cylinder through the inner opening thereof, while flowing back from the other front face along the outer surface. The reverse construction is also conceivable.

It can be provided, according to another feature of the invention, for the introduction of the liquid into the additive receptacle and the removal of liquid therefrom to take place on the same side thereof. This not only permits a particularly compact construction of the admixing device, but also facilitates the replacement or supplementing of the hollow cylindrical bar from the other side.

According to a further development, the receptacle for the bar has a tube, connectable with the liquid inlet and passing with a radial spacing through its interior. The outlet end of the tube is arranged on the side of the bar opposite to the liquid outlet on the bar receptacle. Thus, although liquid introduction and removal again take place on the same side, with the aid of said tube the liquid is supplied to the other side of the bar, so that both liquid streams flow in the same direction over the inner and outer surface. Consequently there is no wearing away of the faces of the bar, so that the bar maintains the same length over its entire life. It is particularly advantageous if the additive receptacle is formed by an interchangeable container.

In order to obtain a particularly good and uniform flow, it is possible to provide the bar receptacle with a turbulence inducing device in the vicinity of the outlet end of the inner tube for the liquid being discharged therefrom. This turbulence inducing device ensures that the flow uniformly flows past the outer surface and inner surface of the hollow cylinder.

If the receptacle is formed by an interchangeable container, the turbulence inducing device is preferably constructed in one piece on the bottom of the container.

For replacement purposes, it is also possible to provide a large container, which can be used to replace the normal container. It can be used e.g. to receive larger, i.e. longer hollow cylindrical bars. It is also possible to place several normal size hollow cylindrical bars in said large container and the latter can be equipped with an extension inner tube. The latter is then arranged in the extension of the normal inner tube, so that the large container can be used together with the normal admixing device. For example, the inner tube can be screwed to the extension inner tube. However, it is particularly advantageous if the connection between the extension inner tube and the inner tube permits an outflow. Thus, a leak is intentionally formed at the connection point. This can be very simply brought about in that the inner tube and the extension inner tube have a certain spacing from one another in the assembled state, so that an annular clearance is formed. This intentional leak improves the flow conditions at the inside of the hollow cylindrical bar. In certain circumstances it may be favourable for the extension inner tube to have at least one outflow opening.

According to another feature of the invention, the admixing device can contain a valve. This valve makes it possible, either to completely prevent the liquid flow through the admixing device, or to switch between a through-flow accompanied by the delivery of an additive and a through-flow without any admixing taking place. This is particularly favorable if the admixing device is to be used e.g. for floor cleaning systems, where there is to be an initial cleaning with an admixed cleaning fluid and a rinsing with clean water. It is particularly advantageous if the flow through the additive receptacle is in secondary flow form, that is, the admixing flow occurs simultaneously with a primary unmixed flow, reducing the effective concentration of additive and/or slowing its erosion or dissolution.

The invention also proposes that the admixing device be connectable to a handle. The handle can e.g. be part of the water supply pipe and can e.g. also be provided with a stop valve. It can either be a screw connection, or a plug connection.

It is particularly favorable if the admixing device can be connected to ancillary devices, while once again providing a screw or plug connection. As a function of the desired use, the admixing device can be connected with the corresponding ancillary devices.

The admixing device according to the invention is particularly advantageous as part of a floor cleaning system. For the purpose of rapid, careful cleaning, great importance is attached to the accurate dosing of the additives and to the possibility of subsequently rinsing with clean water. This is more especially aided by the admixing device proposed by the invention.

The admixture device according to the invention can also form part of a car cleaning system. Soap or wax must be added to the washing water and in both cases great importance is attached to the accurate dosing.

The admixing device according to the invention can be used with particular advantage in a fertilization system, where once again the accurate dosing of the admixed fertilizer is vital.

The admixing device can also be used as part of a window cleaning system.

The invention also proposes a tablet-like or bar-like additive for uniform admixing to liquids, particularly for use in an admixing device according to the invention which, according to the invention, is in the form of a hollow cylinder or a cylindrical ring. The circular cylindrical shape is particularly advantageous.

BRIEF DESCRIPTION OF THE DRAWINGS

Further features, details and advantages of the invention can be gathered from the claims, the following description of a preferred embodiment and the attached drawings, wherein:

DETAILED DESCRIPTION OF THE PREFERRED EMBODIMENTS

Figure 1:
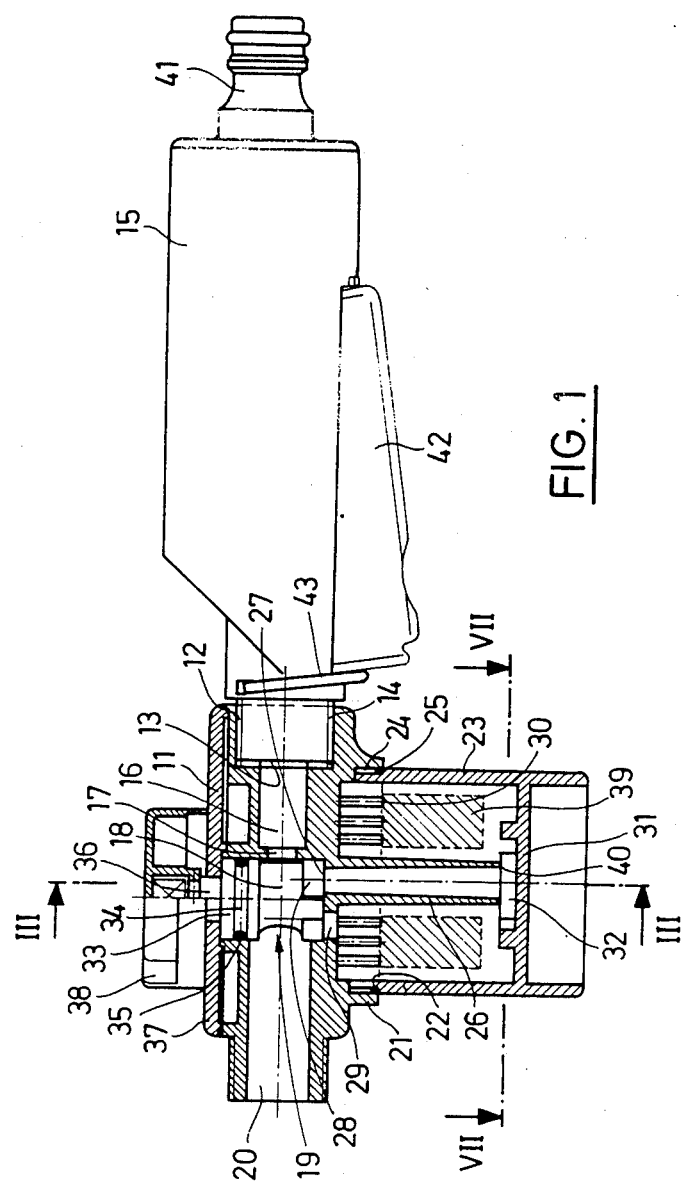
FIG. 1 is a part sectional side view of an admixing device according to the invention with a handle.

The admixing device according to FIG. 1 contains a casing top 11, which to the right has a bore 13 provided with a thread 12. This bore 13 is used for connection to a water supply pipe and in the represented embodiment the external thread 14 of a handle 15 is screwed into thread 12 of bore 13. From bore 13, a reduced diameter bore 16 leads radially inwards and terminates in a through-bore 17 having a further reduced diameter. The valve body 18 of a valve 19 is connected to bore 17. Bore 20 extends along the line of bore 16, and forms the water outlet.

On the bottom of casing top 11 is provided an all-around rib 21, which has an internal thread 22, into which is screwed a container 23, which has an approximately circular cylindrical shape and which is provided on its upper edge with an external thread 24. A seal 25 is provided between threads 22 and 24 for sealing purposes.

On the bottom surface of casing top 11, an inner tube 26 is centrally provided within the space defined by rib 21. The upper opening 27 of tube 26 is shown closed by a shoulder 28 of valve body 18.

In FIG. 1, to the left alongside the inner tube, the casing top has a further bore 29, which leads from the bottom of casing top 11 into bore 20.

Around the upper end of inner tube 26 are provided a plurality of cylindrical, rod-like projections 30, which form gaps between them, through which the liquid can escape through bore 29.

Figure 7:
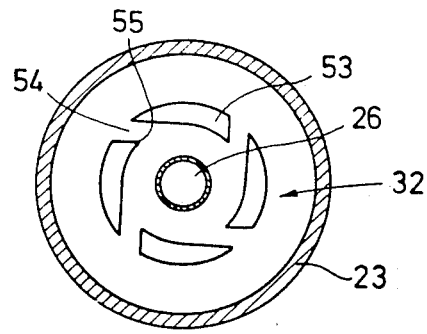
FIG. 7 is a section view taken along line VII—VII of FIG. 1.

Container 23 has a base 31 and, when said container is screwed in, inner tube 26 extends to shortly above base 31. A turbulence inducing device 32, shown in detail in FIG. 7, is formed in one piece with the base.

Valve body 18 has an upper cylindrical part 33 with an annular groove 34, which contains a packing ring 35. With the aid of packing ring 35, valve body 18 is sealed against the casing. On its top surface, valve body 18 has a lug 36, which projects through cover 37 of the casing top and engages there in a recess of a locking handle 38. With the aid of locking handle 38, the valve body 18 can be rotated about its top-to-bottom longitudinal axis in FIG. 1.

An additive tablet or bar 39, indicated by broken lines, is inserted into the interior of container 23. It is shaped like a hollow cylinder, the inner tube 26 extending through the longitudinal bore of said cylinder. The dimensions of bar 39 are selected in such a way that its internal diameter is larger than the external diameter of inner tube 26, while its external diameter is smaller than the internal diameter of container 23. Thus, there is a gap between the inner tube 26 and tablet 39, and between tablet 39 and container 23.

Figure 6:
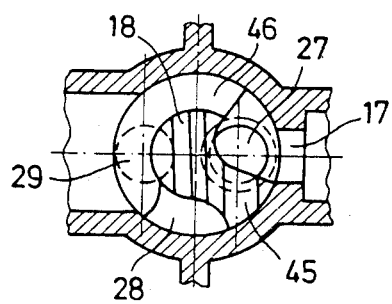
FIG. 6 is a section corresponding to FIG. 4 in a further valve position.

When valve body 18 is in a corresponding position, see, for example FIG. 6, water passes through bore 16, opening 17 and upper opening 27 of inner tube 26 into the inner tube, where it flows out of the outlet end 40 of said tube and is made turbulent by the turbulence inducing device 32. Part of the flow passes through the gap between tube 26 and the bar 39 in the upwards direction, while the other part passes upwards on the outside of bar 39. Between the projections 30, the water, which now contains dissolved additives, can pass through bore 29 into bore 20, from where it is discharged from the admixing device.

Thus, the projections ensure that the end face of bar 39 does not close or clog bore 29. Projections 30 could also be replaced by other devices for the same purpose.

Since the flow passes both along the outer face and the inner face of the hollow cylindrical bar 39, the reduction of the outer surface brought about by the wearing away of the additive is compensated by a simultaneously occurring increase in the size of the inner surface. Thus, the discharged water contains a constant additive proportion.

A handle 15 is screwed to the right of the admixing device according to FIG. 1. On its outside, handle 15 has a nipple 41, for connection of a water hose or a further appliance. On its bottom surface, handle 15 has a pushbutton 42, with the aid of which it is possible to stop or regulate the water flow through handle 15 into the admixing device. The pushbutton 42 can be locked in the open position with the aid of a wire strap 43. The additive proportion is always constant, even if the flow quantity differs.

Figure 2:
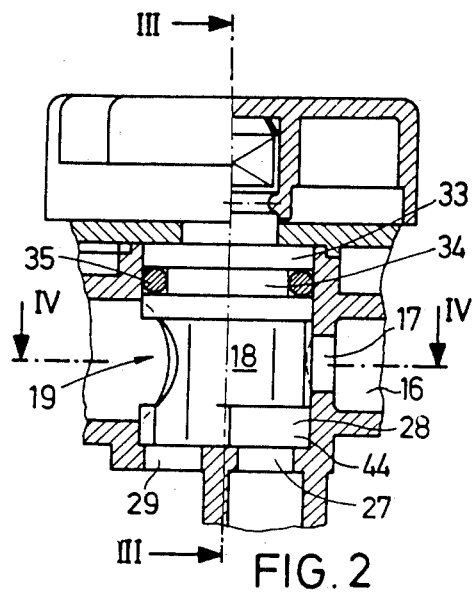
FIG. 2 is a larger-scale view of part of the admixing device of FIG. 1.

FIG. 2 shows details of valve 19 on a larger scale. Valve body 18 is mounted by its upper cylindrical part 33 and its lower part 44 each part fitting into a cylindrical recess, so that valve body 18 can easily be rotated about its longitudinal axis. FIG. 2 also shows that the upper opening 27 of inner tube 26 is closed by the shoulder 28 of the valve body. There is no need to close bore 29, because a sealing of opening 27 prevents any flow through the container.

Figure 3:
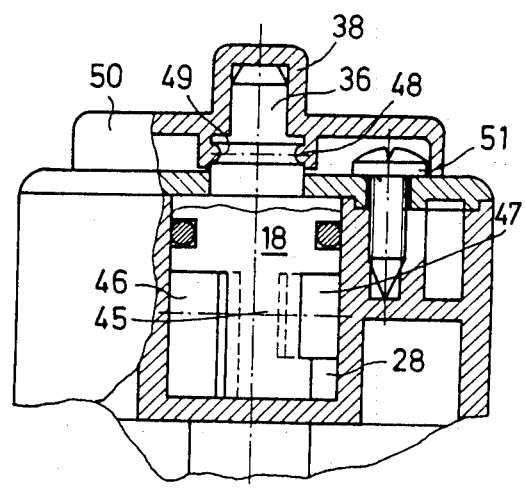
FIG. 3 is a larger-scale partial section view taken along line III—III of FIG. 1.

FIG. 3 shows valve body 18 from the direction of the outlet opening, whereby shoulder 28 can be seen particularly clearly. It is also possible to see that valve body 18 has a central part 45 which, in FIG. 3, is defined to the right and left by passages 46, 47. It is also possible to see that grip 38 is mounted on lug 36 of valve body 18 and engages with a torus 48 in annular groove 49. Grip 38 has a lower flange-like part 50, which covers the assembly screw 51 for cover 37.

Figure 4:
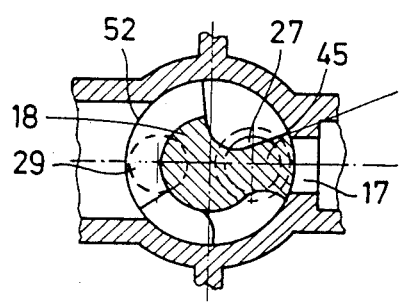
FIG. 4 is a section view taken along line IV—IV of FIG. 2 with the valve closed.

FIG. 4 shows a position of valve body 18 in detail. It can also be seen that the outer circumference 52 of valve body 18 has a circular cylindrical shape. In the position shown in FIG. 4, central part 45 of valve body 18 is positioned in front of opening 17, so that the latter is completely closed. Thus, no water can pass through the admixing device.

Figure 5:
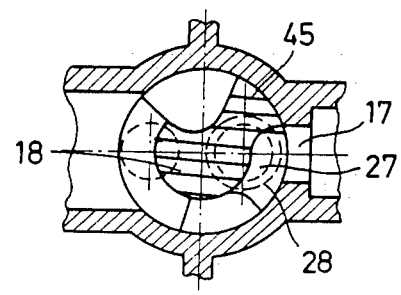
FIG. 5 is a section corresponding to FIG. 4 for a different valve position.

In FIG. 5, valve body 18 has been turned counterclockwise to such an extent compared with its position in FIG. 4 that the central part 45 thereof frees the inlet opening 17. The shoulder 28, of FIG. 3, covers inlet opening 27 for inner tube 26, so that water can pass through the opening 17 and passage 47 to the central part 45 of valve body 18 up to bore 20, from where it leaves the admixing device. In the position of valve body 18 shown in FIG. 5, consequently no admixing takes place.

FIG. 6 shows the position of valve body 18, when it has been turned clockwise compared with its position in FIG. 4. Central part 45 now also frees inlet opening 27 and in this case upper opening 27 of inner tube 26 is also free. Thus, water can pass through opening 27 into inner tube 26 and from there through container 23 to bore 29, from where it can pass into the water outlet 20. Simultaneously, passage 46 provides a direct connection between inlet opening 17 and water outlet 20, so that part of the water passes directly through the admixing device and the flow through the container is then in the form of a secondary flow.

FIG. 7 shows the turbulence inducing device 32, which comprises four, approximately wedge-shaped projections 53, between which are defined approximately spiral passages 54. The water escaping from the discharge end 40 of inner tube 26 is given a counterclockwise twisting movement and edges 55 of projections 53 ensure that part of the water flow remains within the projections 53.

Figure 8:
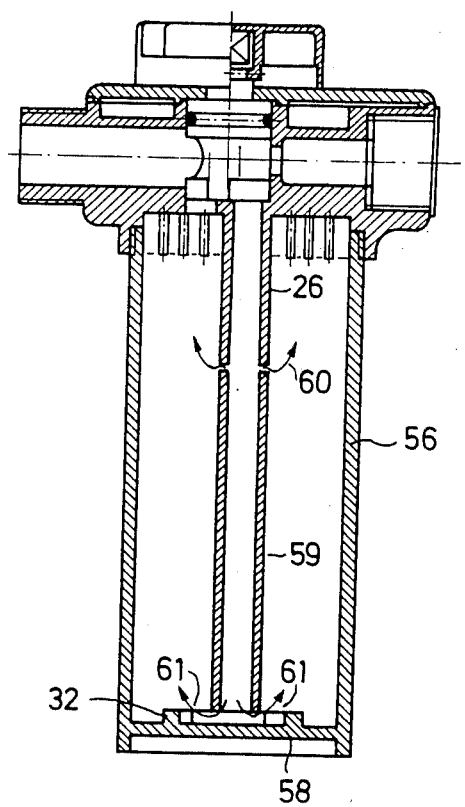
FIG. 8 is a section corresponding to FIG. 1 through an admixing device with attached large container.

FIG. 8 is a side view of the admixing device according to FIG. 1 with a mounted large container 56. The top of the latter also carries a thread 57, which corresponds to thread 24 of container 23.

Large container 56 has a base 58, which also is provided with a turbulence inducing device 32. An extension tube 59 is fixed to the base and is arranged in the axial extension of inner tube 26. In the assembled state, as shown in FIG. 8, the extension tube 59 terminates shortly before the lower end of inner tube 26, so that a certain flow can escape in the direction of arrows 60. In the vicinity of the base 58 of large container 56, extension tube 59 has a plurality of openings, through which the liquid can escape in the direction of arrows 61. Most of the flow escapes at the lower end of extension tube 59, whereas only a small part of the flow escapes at arrows 60.

Either several bars 39 according to FIG. 1, or a single large or long bar can be inserted in large container 56. The flow in the direction of arrows 60 serves to permit a more uniform wearing away of the inner surface of the hollow cylinder.

Valve 19 can be constructed in such a way that it can vary the ratio between the liquid quantity passing through the container, to that which passes directly through, which enables the admixing to be varied. Naturally, the admixing can also be completely switched off.

The admixing device proposed by the invention has the important advantage that it is possible to connect ancillary devices to its outlet, both with a free outflow and with a counterpressure. Unlike in the case of the known admixing devices, the counterpressure does not impair the operation of the present device. It is also possible for even the ancillary device to have a disconnection mechanism.

We claim:

1. A device for uniformly dissolving a solid additive in flowing liquids, comprising:
    a container forming an open-topped receptacle;
    a rigid additive body having a hollow core, the additive being disposed in the receptacle, an external surface of the additive and an internal surface of the additive to be dissolved away by the flowing liquids;
    means for sealably closing the receptacle;
    means defining a liquid inlet to the receptacle and a liquid outlet from the receptacle; and,
    a tube providing fluid communication from the liquid inlet to an outlet of the tube near a bottom of the receptacle, outer dimensions of the additive being smaller than inner dimensions of the receptacle and inner dimensions of the additive being larger than outer dimensions of the tube, the receptacle, tube and additive defining inner and outer annular spaces, the additive being positioned in the receptacle such that liquid flows unidirectionally in concentric axial paths toward the liquid outlet, through flowpaths defined by the annular spaces, one path being defined by the annular space between the tube and the inner surface of the additive and another path being defined by the annular space between the outer surface of the additive and the receptacle, whereby dissolution of the additive from the inner and outer surfaces remains constant as the inner surface is enlarged and the outer surface is diminished while the additive dissolves.

2. The device according to claim 1, comprising a plurality of interchangeable containers.

3. The device according to claim 1, further comprising a turbulence inducing device disposed in the additive receptacle opposite the tube outlet of the tube for directing the liquid discharged from the tube along the concentric paths and promoting dissolution of the additive.

4. The device according to claim 1, further comprising a valve operable to control flow through the device and the receptacle.

5. The device according to claim 1, further comprising means for removably connecting the device to a handle.

6. The device according to claim 1, further comprising means for connecting the device to ancillary devices.

7. The device according to claim 1, comprising means for directing an additive-unmixed, primary liquid flow outside of the receptacle and an additive-mixed, secondary liquid flow through the receptacle.

8. The device according to claim 7, further comprising valve means for controlling liquid flow to select one of the primary flow, the secondary flow and a mixture of the primary and secondary flows.

9. The device according to claim 1, wherein the tube is attached to the liquid inlet means.

10. The device according to claim 1, wherein a portion of the tube is attached to the liquid inlet means and another portion of the tube is attached to the container.

11. The device according to claim 10, wherein the portions of the tube are so axially dimensioned that a gap is formed therebetween when the container is attached.

* * * * *